UNITED STATES PATENT OFFICE.

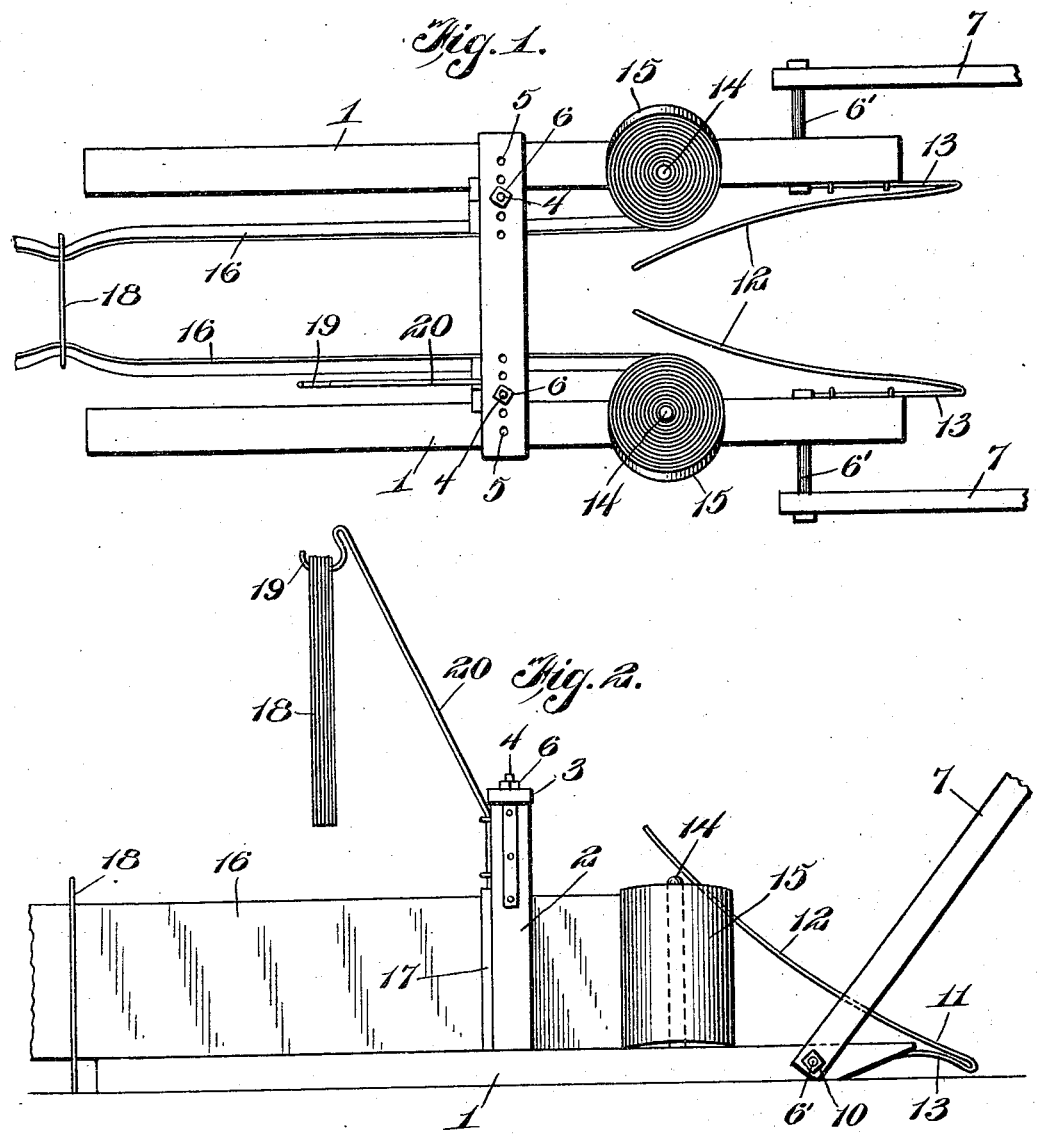

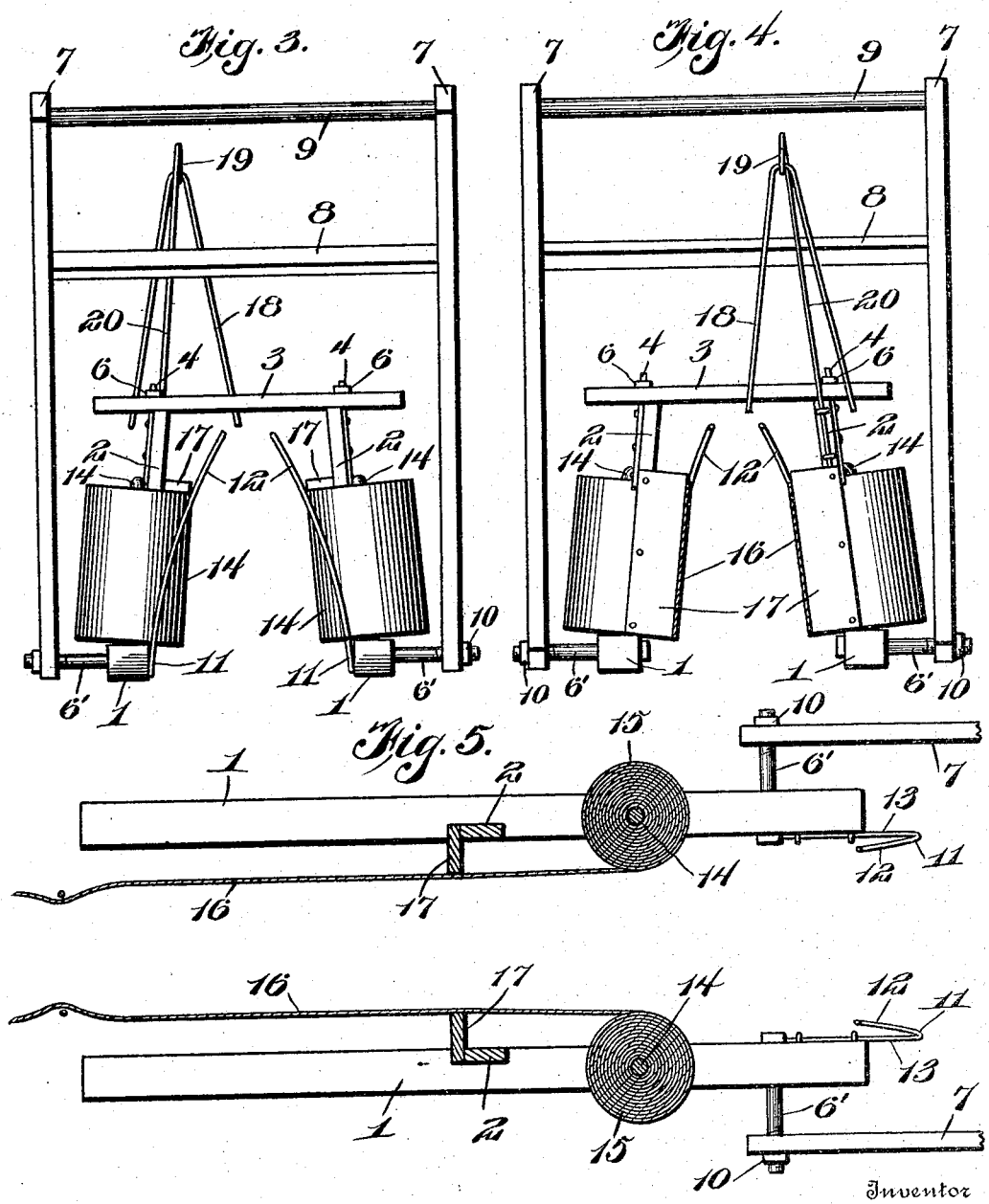

ERNEST E. STEARNS, OF WABASHA, MINNESOTA.

CELERY-WRAPPING MACHINE.

1,187,197.   Specification of Letters Patent.   Patented June 13, 1916.

Application filed January 24, 1916. Serial No. 73,945.

*To all whom it may concern:*

Be it known that I, ERNEST E. STEARNS, a citizen of the United States, residing at Wabasha, in the county of Wabasha and State of Minnesota, have invented new and useful Improvements in Celery-Wrapping Machines, of which the following is a specification.

This invention relates to improvements in machines for wrapping celery, and particularly for wrapping rows of growing celery, the object of the invention being to provide a simple, reliable and efficient device, which may be produced and sold at a comparatively low cost, for applying strips of paper to the opposite sides of rows of celery, for excluding light and air and effecting the bleaching of the growing plants.

A further object of the invention is to provide a means which is adjustable for wrapping rows of different heights, and one or more rows at a time, and obviates the use of hinged or pivoted or spring controlled parts, or other structural elements liable to derangement and which are more or less costly in construction and maintenance.

The invention consists of the features of construction, combination and arrangement of parts herein fully described and claimed, reference being had to the accompanying drawings in which:—

Figure 1 is a top plan view of a celery wrapping machine embodying my invention. Fig. 2 is a side elevation of the same. Fig. 3 is a front elevation of the machine. Fig. 4 is a rear elevation thereof. Fig. 5 is a sectional plan view of the machine.

In carrying my invention into practice, I provide a celery wrapping machine comprising a pair of parallel, longitudinally extending skids or runners 1, which may be of any suitable length and made of wood or other suitable material. These skids or runners are connected by an arch comprising a pair of rigid standards 2, and an upper cross bar 3. The standards have secured thereto fastening members or bolts 4 which pass through openings 5 in the cross bar 3 and are fitted with nuts 6 whereby the parts are firmly united. The holes 5 are arranged in rows or series at the opposite ends of the cross bar 3, thus adapting said bar for adjustable connection with the standards to space the runners 1 a greater or less distance apart for the purpose of adapting the machine to wrap one or more rows of celery at a time. The cross bar 3 of the arch is arranged at a sufficient height to enable the machine to be employed for wrapping either short or tall celery, and, in fact, celery at any height.

Extending through the forward ends of the runners is a transverse rod 6, which extends loosely through openings in said runners, allowing the latter to be relatively adjusted with freedom, and pivotally mounted upon the projecting ends of this rod are handle bars 7 which are suitably connected, as by means of a brace 8, and a grip rod or round 9, whereby the machine may be conveniently drawn along the row or rows of growing plants, the said handle bars being pivotally mounted upon the rod, and held in position by retaining nuts 10. Supported upon the forward end of the runners 1 are plant gathering or clustering devices 11, each preferably formed of a single length of stout spring wire, the wires being bent to provide rearwardly projecting and converging gathering arms 12 extending toward the space between the standards 2 and having lower backturned bracket arms 13 which are suitably fastened to the runners. The arms 12 of these gathering or clustering devices form a V-shaped or flaring entrance to the passageway through the frame of the implement and act to bear yieldingly against the sides of the plants of one or more rows and to move the plants inwardly and raise any plant which is not entirely erect, thus bringing the plants of the row together in a substantially compact mass ready for the application of the shielding strips of paper. In accordance with the invention, posts or spindles 14 are mounted upon the runners 1 at points in advance of the standards 2 to revolubly receive paper rolls 15, from which the paper is carried in the form of strips 16 rearwardly between the sides of the frame so as to dispose the strips of paper upon opposite sides of the rows of plants, the strips being thus arranged at the sides of the plants to maintain the same in compact condition and shield the plants from the air and sunlight, thus bleaching them in a manner readily understood. Secured to the uprights 2 are inwardly projecting guide members 17, which provide a constricted passageway for the relative rearward travel of the plants and paper strips as the machine is drawn along the row of plants. These guides preferably consist of vertically disposed boards or plates which hold the plants and paper strips compressed to permit of the downward insertion of wire staples 18 at desired intervals into the ground and straddling the plants and paper strips to hold the same in fixed relationship. These wire staples, of which any suitable number may be carried upon the machine, are supported by a hook or fork 19 upon a bracket 20 secured to some suitable portion of the arch of the frame.

In the operation of the device, it will be understood that the machine is brought into position to compact the plants at one end of a row or two or more adjacent rows and the paper strips are unwound from the rolls and suitably secured at their free ends at such end of the row or rows, after which the machine is drawn forward over the field to reel out the paper on opposite sides of the rows, as previously explained, until the opposite ends of the rows are arranged, staples being applied at suitable intervals to hold the plants compressed and shielded, and the strips being suitably severed from the rolls at the far ends of the rows and fastened in position against displacement. By this mode of operation the plants will be gathered in a proper compact manner, bound and shielded, so as to exclude light and air and thus bleach the plants to render them crisp and tender. It will be evident that in the operation described steadiness and stability are secured by the use of runners instead of wheels, and these runners lie close to the ground and prevent any interference with the gathering and raising of the marginal plants and their holding in an upright position. Furthermore, by the use of resilient front gatherers and the fixed rear guides or compressing members 17, the use of hinges, pivots and springs or other parts liable to become deranged or easily injured is avoided, and greater simplicity and economy of production and maintenance insured. By the construction defined a wrapping implement is provided which is not only adjustable for the purposes set forth, but may be drawn and operated by a single person, and easily and conveniently kept in working order and repairs, the advantages of which will be appreciated.

I claim:—

1. A celery wrapping machine comprising a pair of runners, an arch connecting the runners, vertically disposed guide members extending inwardly of the plan of the runners in rear of the upright portions of the arch, paper roll supporting spindles upon the runners in advance of the arch, a traction device connected with the runners, and spring gathering and compressing devices having fastening arms secured at one end to the forward ends of the runners and projecting a short distance forwardly therefrom, and having free resilient guiding arms extending rearwardly in converging relation toward the space between the said guide members.

2. A celery wrapping machine comprising a pair of runners, uprights supported by the runners, a cross bar carried by the uprights and forming therewith an arch, said bar and uprights being adjustably connected for spacing the runners at different distances apart, a traction device connected with the runners, guide boards or plates upon the standards of the arch, roll supporting spindles on the runners in advance of said uprights, and yielding spring gathering and compressing devices supported upon the forward ends of the runners and extending rearwardly in converging relation between said spindles and toward the guide plates formed by the arch.

In testimony whereof I affix my signature in presence of two witnesses.

ERNEST E. STEARNS

Witnesses:
L. WHITMORE,
M. STIEVER.

Copies of this patent may be obtained for five cents each, by addressing the "Commissioner of Patents. Washington, D. C."